United States Patent
Liu et al.

(10) Patent No.: US 12,071,160 B2
(45) Date of Patent: Aug. 27, 2024

(54) SYSTEMS AND METHODS FOR GENERATING VEHICLE CORRIDORS TO IMPROVE PATH PLANNING EFFICIENCY

(71) Applicant: Aurora Operations, Inc., Pittsburgh, PA (US)

(72) Inventors: Chenggang Liu, Pittsburgh, PA (US); Daoyuan Jia, Pittsburgh, PA (US); David McAllister Bradley, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 560 days.

(21) Appl. No.: 17/028,203

(22) Filed: Sep. 22, 2020

(65) Prior Publication Data

US 2022/0017112 A1    Jan. 20, 2022

Related U.S. Application Data

(60) Provisional application No. 63/053,891, filed on Jul. 20, 2020.

(51) Int. Cl.
*B60W 60/00* (2020.01)
*B60W 30/095* (2012.01)
*B60W 40/10* (2012.01)

(52) U.S. Cl.
CPC ...... *B60W 60/0011* (2020.02); *B60W 30/095* (2013.01); *B60W 40/10* (2013.01); *B60W 60/0016* (2020.02); *B60W 2554/4041* (2020.02)

(58) Field of Classification Search
CPC ........... B60W 60/0011; B60W 30/095; B60W 40/10; B60W 60/0016; B60W 2554/4041; B60W 60/00–60/007; B60W 40/00–2040/1392; G05D 1/00–1/12
USPC .......................................................... 701/23
See application file for complete search history.

(56) References Cited

U.S. PATENT DOCUMENTS

| | | | | |
|---|---|---|---|---|
| 10,696,301 | B2* | 6/2020 | Abe | G05D 1/0212 |
| 10,928,820 | B1* | 2/2021 | Tao | G05D 1/0214 |
| 2015/0175159 | A1* | 6/2015 | Gussner | B60W 10/20 |
| | | | | 701/1 |
| 2017/0247029 | A1* | 8/2017 | Watanabe | B60W 30/095 |
| 2018/0099667 | A1* | 4/2018 | Abe | G08G 1/167 |
| 2019/0250622 | A1* | 8/2019 | Nister | B60W 60/0027 |
| 2019/0355257 | A1* | 11/2019 | Caldwell | G08G 1/166 |

(Continued)

*Primary Examiner* — Mohamed Abdo Algehaim
(74) *Attorney, Agent, or Firm* — Dority & Manning, P.A.

(57) ABSTRACT

The present disclosure is directed to generating vehicle motion corridors for use in generating autonomous vehicle paths. In particular, a computing system can access map data for a geographic area and sensor data for the geographic area around an autonomous vehicle. The computing system can identify, based on the map data and the sensor data, object data describing a position and a size of one or more objects in the geographic area of the autonomous vehicle. The computing system can access path data describing a nominal path through the geographic area. The computing system can determine a plurality of corridor segments associated with the nominal path. The computing system can generate a vehicle motion corridor by aggregating the plurality of corridor segments, wherein the vehicle motion corridor defines an area in which the autonomous vehicle can travel without colliding with the one or more objects.

19 Claims, 9 Drawing Sheets

(56) References Cited

U.S. PATENT DOCUMENTS

| | | | | |
|---|---|---|---|---|
| 2019/0367021 | A1* | 12/2019 | Zhao | B60W 60/0011 |
| 2020/0172100 | A1* | 6/2020 | Kato | G08G 1/16 |
| 2020/0209006 | A1* | 7/2020 | Iwano | G01C 21/3492 |
| 2020/0218261 | A1* | 7/2020 | Zidek | G07C 5/0808 |
| 2020/0377079 | A1* | 12/2020 | Sung | B60W 10/18 |
| 2020/0398894 | A1* | 12/2020 | Hudecek | G05D 1/0214 |
| 2021/0035442 | A1* | 2/2021 | Baig | G08G 1/0112 |
| 2021/0046924 | A1* | 2/2021 | Caldwell | B60W 30/0956 |
| 2021/0094539 | A1* | 4/2021 | Beller | G08G 1/167 |
| 2021/0107514 | A1* | 4/2021 | Watanabe | B60W 30/18163 |
| 2021/0129834 | A1* | 5/2021 | Gier | G05D 1/0214 |
| 2021/0155234 | A1* | 5/2021 | Kohler | B60W 30/14 |
| 2021/0197862 | A1* | 7/2021 | Gud | B60W 60/0015 |
| 2021/0237769 | A1* | 8/2021 | Ostafew | B60W 30/18159 |
| 2021/0263519 | A1* | 8/2021 | Ogino | B60W 30/18159 |
| 2021/0278849 | A1* | 9/2021 | Zhu | B60W 60/001 |
| 2022/0219684 | A1* | 7/2022 | Shimizu | B60W 40/12 |

* cited by examiner

SYSTEMS AND METHODS FOR GENERATING VEHICLE CORRIDORS TO IMPROVE PATH PLANNING EFFICIENCY

RELATED APPLICATION

This application claims priority to and the benefit of U.S. Provisional Patent Application No. 63/053,891, filed Jul. 20, 2020, which is hereby incorporated by reference in its entirety.

FIELD

The present disclosure relates generally to autonomous vehicles. More particularly, the present disclosure relates to path planning for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include accessing map data for a geographic area and sensor data for the geographic area around an autonomous vehicle. The method can include identifying, based on the map data and the sensor data, object data describing a position and a size of one or more objects in the geographic area of the autonomous vehicle. The method can include accessing path data describing a nominal path through the geographic area. The method can include determining a plurality of corridor segments associated with the nominal path, wherein the plurality of corridor segments correspond to a series of locations along the nominal path described in the path data, each location being associated with an expected position of the autonomous vehicle at a particular point in time. The method can include generating a vehicle motion corridor by aggregating the plurality of corridor segments, wherein the vehicle motion corridor defines an area in which the autonomous vehicle can travel without colliding with the one or more objects.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
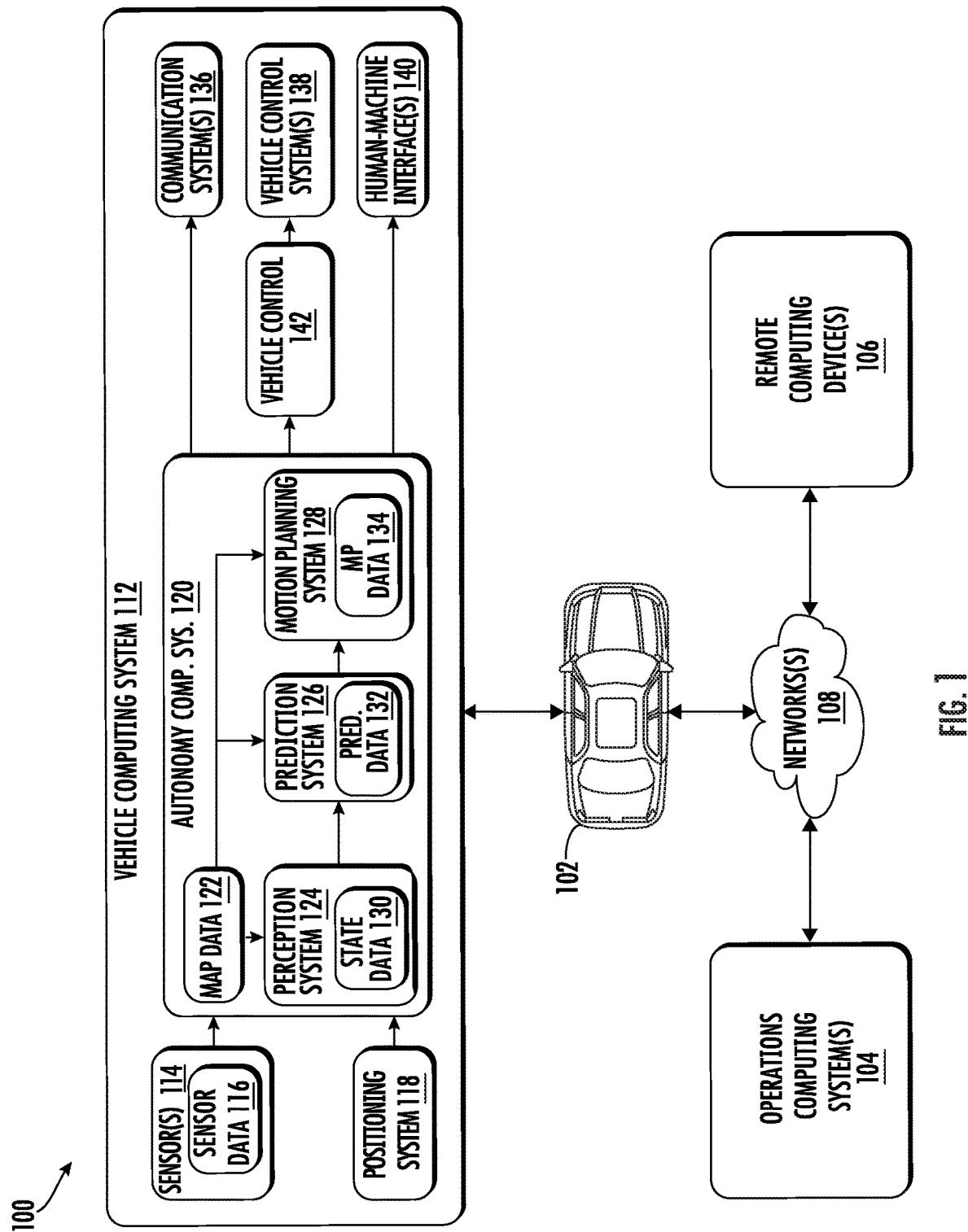
FIG. 1 depicts a block diagram of an example autonomous vehicle according to example embodiments of the present disclosure.

Generally, the present disclosure is directed to generating a vehicle travel corridor to improve path planning for an autonomous vehicle. A vehicle travel corridor can be a data structure representing an area through which the autonomous vehicle can follow a path that has been determined to be relatively safe for the autonomous vehicle, with low risk of collision. A corridor data structure can be generated by accessing a nominal path, which represents an ideal path through a particular environment, prior to considering obstacles that may be present. This can include, for example, a path through the center of a lane (e.g., a lane for a ground automobile, skylane for an autonomous VTOL vehicle, etc.). An associated corridor generation system can then access obstacle data for the area, the obstacle data indicating obstacles, the position of the obstacles, and/or the size/orientation of the obstacles. The corridor generation system can determine a total length of the corridor based on the current longitudinal plan. The total length can be divided into a number of corridor segments (or slices).

For a respective corridor segment, the corridor generation system can determine a plurality of distance values, each distance value representing the distance between a point along the nominal path within the corridor segment and one or more obstacles. The corridor generation system can identify the distance value with the smallest total distance. The smallest total distance can be associated with the respective corridor segment as the offset for that segment. The offset value determines the width of the corridor data structure at that particular segment, which can vary between segments. The corridor generation system can aggregate all the corridor segments into a single corridor data structure. The corridor data structure can be used by a motion planner of the autonomous vehicle to efficiently plan safe and reliable routes.

For example, an autonomous vehicle can use a path planning system to plan trajectories for an autonomous vehicle as it travels along a road. The path planning system can employ the corridor generation system to generate a vehicle corridor data structure through an upcoming geographic area. To do so, the corridor generation system can access a nominal path that describes the ideal path through the upcoming geographic area. In addition, the corridor generation system can obtain obstacle data for the upcoming geographic area. The corridor generation system can determine that the expected velocity of the autonomous vehicle is 10 meters per second. Based on this expected velocity, the corridor generation system can determine a number of segments associated with the corridor data structure. Thus, if the corridor data structure is generated for an 8 second time window, the number of segments can be 80 if each segment represents a meter. In this way, the corridor generation system can ensure that the number of segments included in the corridor data structure does not exceed that which is needed for the current planning interval and thus conserves time and reduces the number of processing cycles used for this task.

The corridor generation system can generate offsets for each segment, by determining the distance to the closest obstacle. To do so, the corridor generation system can detect obstacles on rays mathematically generated to extend perpendicularly from a point of the nominal path with the current segment in both directions. The corridor generation system can determine whether the perpendicular ray will intersect with any obstacles. For example, while constructing the current segment of the vehicle travel corridor, the corridor generation system can identify an obstacle three meters to the left of the nominal path and another obstacle one meter to the right. These values can be used as the offset values for the corridor segment, such that the vehicle travel corridor can extend three meters to the left and one meter to the right of the nominal path in this segment. This process can be repeated for each corridor segment. The plurality of corridor segments can then be aggregated into a single corridor data structure.

The path planning system can access the corridor data structure to efficiently identify areas that are safe for the autonomous vehicle to traverse. Thus, the path planning system can eliminate much of the overhead in generating trajectories for the autonomous vehicle.

More specifically, the corridor generation system can be included in an autonomous vehicle (e.g., ground-based vehicle, aerial vehicle, etc.). An autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, generate trajectories based on the sensor data, and perception/predicted motion of the objects, and, based on the trajectory, transmit control signals to a vehicle control system and thereby enable the autonomous vehicle to move to its target destination.

To accomplish these operations, the autonomy computing system can include, for example, a perception system, a prediction system, and a motion planning system. As noted above, many of the functions performed by the perception system, prediction system, and motion planning system can be performed, in whole or in part, by one or more structured machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to the structured machine-learned model(s). In addition or alternatively, the autonomous vehicle can access map data (e.g., high definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system.

The vehicle computing system can use the perception data, prediction data, map data, and/or other data to generate a motion plan for the vehicle. As noted above, one part of generating a motion plan can include generating a corridor data structure using perception data, prediction data, and/or map data.

A route can describe a specific path for the autonomous vehicle to travel from a current location to a destination location. The route can be generated by a system remote from the autonomous vehicle and communicated to the autonomous vehicle and/or the route can be generated onboard the autonomous vehicle. The vehicle computing system can generate potential trajectories for the autonomous vehicle to follow as it traverses the route. Each potential trajectory can be executable by the autonomous vehicle (e.g., feasible for the vehicle control systems to implement). Each trajectory can be generated to comprise a specific amount of travel time (e.g., eight seconds, etc.). In addition, each potential trajectory can use the corridor data structure to ensure that the selected potential trajectory remains within the corridor data structure (and thus avoids potential obstacles).

The autonomous vehicle can select and implement a trajectory for the autonomous vehicle to navigate a specific segment of the route. For instance, the trajectory can be translated and provided to the vehicle control system(s) (e.g., via a vehicle interface/controller) that can generate specific control signals for the autonomous vehicle (e.g., adjust steering, braking, velocity, and so on). The specific control signals can cause the autonomous vehicle to move in accordance with the selected trajectory.

The corridor generation system can generate a corridor data structure for use by the path planning system. The corridor generation system can obtain nominal path data for the autonomous vehicle based on an upcoming path. In some examples, the path generation system can identify a nominal path for the autonomous vehicle going forward. The corridor generation system can access the nominal path data for a particular amount of time. In some examples, the corridor generation system access can estimate velocity data for the autonomous vehicle. Velocity data can be information supplied by a speed planner (or other component of a motion planner) that represents one or more estimated velocity values for the autonomous vehicle during a particular time period and one or more estimated acceleration values for the autonomous vehicle during the time period. Using the estimated velocity data the corridor generation system can determine the amount of the nominal path to be accessed by the corridor generation system. In some examples, the estimated velocity can be used to generate a maximum travel distance for a particular period of time.

The corridor generation system can obtain a longitudinal plan generated by the class planning system. The corridor generation system can determine the maximum travel distance during a particular period of time. One example of a time period may be eight seconds but other time periods can be used depending on the specific needs of the system for which the corridor is being generated. In addition, the corridor generation system can access map data for the geographic area around the autonomous vehicle and through which the autonomous vehicle will be passing. In some examples, the geographic area around the autonomous vehicle can include an area in the field of view of the autonomous vehicle. An area can be considered to be within the field of view of the autonomous vehicle can include any area that the autonomous vehicle can gather sensor data from. In some examples, the map data will include known obstacles in the geographic area. In addition, the corridor generation system can access information produced by the perception system to identify one or more obstacles in the area through which the autonomous vehicle will be passing.

The corridor generation system can determine a number of segments that will make up the corridor data structure. The segments can be two-dimensional or three-dimensional. Using the longitudinal plan, the corridor generation system can accurately determine the number of segments needed for the particular time period for which the corridor is being used. For example, if each segment represents 1 meter, and the autonomous vehicle is traveling at 11 meters per second for a period of 8 seconds, the corridor generation system can generate 90 segments (e.g., 88 segments plus a few extra segments as a buffer).

In some examples, the nominal path includes a series of points, each point being represented by a set of coordinates for the location of the autonomous vehicle at a particular point in time along the nominal path (e.g., 1 second, 2 seconds, 3 seconds, and so on). Thus, each point can represent a subsequent step in a time series along that nominal path such that the nominal path is represented by connecting each of the points. Each segment can represent a particular point or coordinate set in the series of points.

For each segment, the corridor generation system can determine the location of the point within the segment. The corridor generation system can identify one or more obstacles in the geographic area of the current corridor segment. In some examples, the corridor generation system can determine whether each obstacle is (or is not) blocking the nominal path. In accordance with the determination that a particular obstacle is not blocking the path, the corridor generation system can determine which side of the nominal path is associated with the obstacle. For example, the plurality of obstacles can be divided into obstacles that fall on the left side of the nominal path and obstacles that fall on the right side of the nominal path.

For each obstacle, the corridor generation system can determine whether the obstacle can be ignored. In some examples, an obstacle can be ignored based at least in part on the total distance between the point in the nominal path that is within the corridor segment and the obstacle. Any obstacles with a distance greater than a threshold distance value can be ignored with respect to the current corridor segment calculations. Thus, an obstacle can be ignored for one corridor segment but not for another.

In some examples, the corridor generation system can determine whether to ignore an obstacle by determining whether the obstacle intersects with a line drawn perpendicular to the nominal path within the current corridor segment. Each obstacle can be surrounded by a geometric shape (e.g., a circle, square, rectangle, etc.) that serves to define an outer limit of the obstacle's edges. If the geometric shape and the perpendicular line do not intersect, the obstacle can be ignored.

The corridor generation system can determine, for each obstacle that is not ignored, a distance between the obstacle and the coordinate set in the segment. In some examples this distance can be generated by extending a line perpendicular to the nominal path point and identifying the distance at which it intersects with each obstacle. As noted above, any obstacle not intersected contacted by the perpendicular line may be ignored.

The corridor generation system can determine a minimum distance between an obstacle and the point on the nominal path included in the current corridor segment. For example, the corridor generation system can determine the closest obstacle to the point on the nominal path that is included in the corridor segment. In some examples, the corridor generation system can determine a nearest obstacle on each side of the nominal path. Thus, the corridor generation system can determine both a left offset and a right offset for the corridor segment. In some examples, all the obstacles near the current corridor segment can be ignored (or there are no obstacles nearby to begin with). In this example, the corridor generation system can determine the distance from the autonomous vehicle to the edge of a lane the autonomous vehicle is currently in. The offset values can then be set such that the corridor segment extends across the entire current lane. In other examples, the offset value can be set to a predetermined default value.

In some examples, the corridor generation system can determine that the obstacle is blocking the nominal path. In response, the corridor generation system can determine a distance between the point of the nominal path and the edge of the obstacle (e.g., the distance the point would need to move to ensure that the nominal path does not intersect with the obstacle). This distance can then be set as the offset value for the corridor segment and set to a negative value, such that the corridor data structure passes around the obstacle. In other examples, the nominal path can be altered by laterally shifting the one or more points that would intersect with the obstacle. In addition, one or more points before or after the blocking obstacle can be laterally shifted to ensure that the path is smooth and does not generate acceleration values above a predetermined threshold.

In some examples, the corridor generation system can prefer generating a corridor segment such that it passes obstacles on the left. Thus when an obstacle is determined to be blocking, the corridor generation system can generate a negative offset value such that the corridor data structure can pass the obstacle on the left. In accordance with the determination that the obstacle is not blocking the nominal path, the corridor generation system can generate offset values for the corridor segment as described above.

In some examples, once all of the segments have been generated by the corridor generation system, the corridor generation system can aggregate the corridor segments into a single corridor data structure that can represent the entire likely travel distance of the autonomous vehicle during a time period.

Once the corridor data structure has been generated, the path planning system can use it to verify the safety of potential trajectories without having to reevaluate the entire path for potential obstacles and collisions. This can result in significant savings in processing time and data storage needed to plan a path for the autonomous vehicle going forward.

The following provides an end-to-end example of the technology described herein. An autonomous vehicle can include a motion planning system. The motion planning system can include a corridor generation system. The corridor generation system can access map data for a geographic area and sensor data for the geographic area around an autonomous vehicle. In some examples, the map data includes object data for the one or more objects in the geographic area of the autonomous vehicle. In some examples, the sensor data is point cloud data generated by a LIDAR sensor.

The corridor generation system can identify, based on the map data and the sensor data, object data describing a position and size of one or more objects in the geographic area of the autonomous vehicle. The corridor generation system can analyze the point cloud data to identify one or more objects in the geographic area of the autonomous vehicle.

The corridor generation system can access path data describing a nominal path through the geographic area. The corridor generation system can determine a series of locations along the nominal path described in the path data, each location being a fixed distance from the next location. The corridor generation system can determine a speed value associated with the autonomous vehicle. The corridor generation system can select a number of locations based, at least in part, on the speed value.

For each respective location in the series of locations, the corridor generation system can determine an offset distance for the respective location based on the position and size of one or more objects in the geographic area. The corridor generation system can determine one or more distance values, each distance representing a distance from the respective location to one in the one or more objects. The corridor generation system can determine a smallest distance value from the one or more distance values. The corridor generation system can generate a corridor segment including at least the smallest distance value. In some examples, the distances from the nominal path can be signed such that values on a particular side of the nominal path (e.g., the left side) may be positive and values on the other side of the nominal path (e.g., the right side) may be value. If values are represented in this way, the smallest distance value may be calculated based on an absolute value of the distance (e.g., disregarding sign values). In this way, a large negative value for the distance (when on the negative side of the nominal path) would, when converted to an absolute value, be a larger value than a small negative value.

The corridor generation system can access object data for one or more objects in the geographic area of the autonomous vehicle. For each object described in the object data. The corridor generation system can determine whether the object blocks the nominal path. In response to determining that the object does not block the nominal path, the corridor generation system can determine the distance between the object and the respective location. The corridor generation system can determine whether the distance between the object and the respective location exceeds a threshold distance. In response to determining that the distance between the object and the respective location exceeds a threshold distance, the corridor generation system can classify the object as ignorable for the respective location.

In response to determining that the distance between the object and the respective location does not exceed a threshold distance, the corridor generation system can classify the object as non-ignorable for the respective location. To determine the smallest distance value, the corridor generation system can select a smallest distance value from the distance values associated with objects that are classified as non-ignorable. In some examples, the offset distance can include a left offset value and a right offset value.

The corridor generation system can determine, for each object, whether the object is on a left side of the nominal path or a right side of the nominal path. The corridor generation system can identify one or more distance values for one or more objects determined to be on the left side of the nominal path. The corridor generation system can select a first smallest distance value from the one or more distance values associated with one or more objects determined to be on the left side of the nominal path. The corridor generation system can assign the first smallest distance value to the left offset value.

The corridor generation system can identify one or more distance values for one or more objects determined to be on the right side of the nominal path. The corridor generation system can select a second smallest distance value from the one or more distance values associated with one or more objects determined to be on the right side of the nominal path. The corridor generation system can assign the first smallest distance value to the right offset value.

The corridor generation system can, in response to determining that the object blocks the nominal path, generate negative offset values such that the corridor does not include the blocking object. To do so, the corridor generation system can determine the distance from the point of the nominal path inside the current segment to the edge of the object. This value can be represented as a negative and set to the offset value. In some examples, the distance from the point on the nominal path to the edge of the obstacle can be calculated such that the corridor data structure will pass on the left side of the object.

Using the calculated offset distance (or distances when both a left and right distance is generated, the corridor generation system can generate a corridor segment including the respective location and the offset distance(s). The corridor generation system can generate a vehicle motion corridor by aggregating a plurality of corridor segments representing the series of locations. The vehicle motion corridor can define an area in which a vehicle can travel without colliding with an object in the one or more objects.

Once the corridor data structure has been generated, the motion planner can generate a trajectory for the autonomous vehicle based, at least in part, on the vehicle motion corridor. For example, the motion planner can compare each potential trajectory to the corridor data structure. To do so, a trajectory evaluation system employed by the motion planner can determine the position of the autonomous vehicle at each point along a potential trajectory. Then, using the current position, heading, and dimensions of the autonomous vehicle, the trajectory evaluation system can determine whether the autonomous vehicle will go outside the boundaries defined by the corridor data structure. If the potential trajectory causes the autonomous vehicle to go outside the boundaries defined by the corridor data structure, the trajectory evaluation system can remove the potential from consideration. This allows the motion planner (via the trajectory evaluation system) to significantly reduce the amount of time and processing cycles needed to evaluate potential trajectories.

Various means can be configured to perform the methods and processes described herein. For example, a computing system can include data access unit(s), object identification unit(s), path analysis unit(s), slice constructions unit(s), corridor aggregation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access map data for a geographic area and sensor data for the geographic area around an autonomous vehicle. For example, a corridor generation system can access map data from a map database and receive sensor data from a LIDAR sensor associated with an autonomous vehicle. A data access unit is one example of a means for accessing map data for a geographic area and sensor data for the geographic area around an autonomous vehicle.

The means can be configured to identify, based on the map data and the sensor data, object data describing the position and size of one or more objects in the geographic area of the autonomous vehicle. The corridor generation system can analyze map data and sensor data to identify the position and orientation of one or more objects in the area around the autonomous vehicle and its future path. This information can be stored as a detection header and provided to the model as input. An object identification unit is one example of a means for identifying, based on the map data and the sensor data, object data describing the position and size of one or more objects in the geographic area of the autonomous vehicle.

The means can be configured to access path data describing a nominal path through the geographic area and determine a series of locations along the nominal path described in the path data, each location being a fixed distance from the next location. For example, the corridor generation system can access a predetermined nominal path with a series of locations already determined or determine the number of points along the nominal path based on the velocity of the autonomous vehicle. A path analysis unit is one example of a means for accessing path data describing a nominal path through the geographic area and determining a series of locations along the nominal path described in the path data, each location being a fixed distance from the next location.

The means can be configured to determine an offset distance for the respective location based on the position and size of one or more objects in the geographic area and generate a corridor segment including the respective location and the offset distance for each respective location in the series of locations. For example, the corridor generation system can determine a distance from a point on the nominal path in the particular corridor segment to the closest obstacle and use that distance as the offset distance. A slice construction unit is one example of a means for determining an offset distance for the respective location based on the position and size of one or more objects in the geographic area and generating a corridor segment including the respective location and the offset distance for each respective location in the series of locations.

The means can be configured to generate a vehicle motion corridor by aggregating a plurality of corridor segments representing the series of locations. The vehicle motion corridor can define an area in which a vehicle can travel without colliding with an object in the one or more objects. For example, the corridor generation system can aggregate the corridor segments such that they form a single contiguous corridor data structure. A corridor aggregation unit is one example of a means for generating a vehicle motion corridor by aggregating a plurality of corridor segments representing the series of locations. The vehicle motion corridor can define an area in which a vehicle can travel without colliding with an object in the one or more objects.

The systems and methods described herein provide a number of technical effects and benefits. More particularly, the systems and methods of the present disclosure provide improved techniques for generating and using a vehicle travel corridor data structure for use when path planning for an autonomous vehicle. Previous versions of the motion planners generate a corridor for the entire nominal path such that the path planning system generates more corridor data structure than is needed. In addition, using the minimal distance to obstacles as the corridor offset rather than the minimal projection distance of obstacle vertices to the reference line as used in previous versions enables the motion planning system to use an "enclosing circle" to filter out irrelevant obstacles more efficiently. This will further reduce running time especially in cases where there are many obstacles far away from the nominal path cases. Thus, the present method enables the motion planning system to more efficiently evaluate potential trajectories. As a result, the current process can perform the detection, prediction, and motion planning steps more efficiently and safely. This results in a reduction in the amount of processing cycles necessary, reducing the amount of data storage needed, and reducing the amount of energy used by the system. Reducing energy consumption increases the useful battery life of any battery systems included in the autonomous vehicle.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that stores data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy system sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy system sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy system sensor data 116 can be indicative of locations associated with the one or more objects within the surrounding environment of the vehicle 102 at one or more times. For example, autonomy system sensor data 116 can be indicative of one or more LIDAR point clouds associated with the one or more objects within the surrounding environment. The one or more autonomy system sensors 114 can provide the autonomy system sensor data 116 to the autonomy computing system 120.

In addition to the autonomy system sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy system sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy system sensor data 116 from the one or more autonomy system sensors 114, attempt to determine the state of the surrounding environment by performing various processing techniques on the autonomy system sensor data 116 (and/or other data), and generate an appropriate motion plan through the surrounding environment. The autonomy computing system 120 can control the one or more vehicle control systems 138 to operate the vehicle 102 according to the motion plan. One or more of these systems/computing functions can be included within the same system and/or share one or more computing resources.

The perception system 124 can identify one or more objects that are proximate to the vehicle 102 based on autonomy system sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route). In some examples, the determined cost of a particular candidate motion plan can be determined, at least in part, based on a generated vehicle corridor structure that represents a safe area in which no collisions are predicted.

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a vehicle controller 142 configured to translate the motion plan data 134 into instructions. By way of example, the vehicle controller 142 can translate a determined motion plan data 134 into instructions for controlling the vehicle 102 including adjusting the steering of the vehicle 102 "X" degrees and/or applying a certain magnitude of braking force. The vehicle controller 142 can send one or more control signals to the responsible vehicle control system 138 (e.g., braking control system, steering control system and/or acceleration control system) to execute the instructions and implement the motion plan data 134.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a passenger seat in the back of the vehicle).

Figure 2:
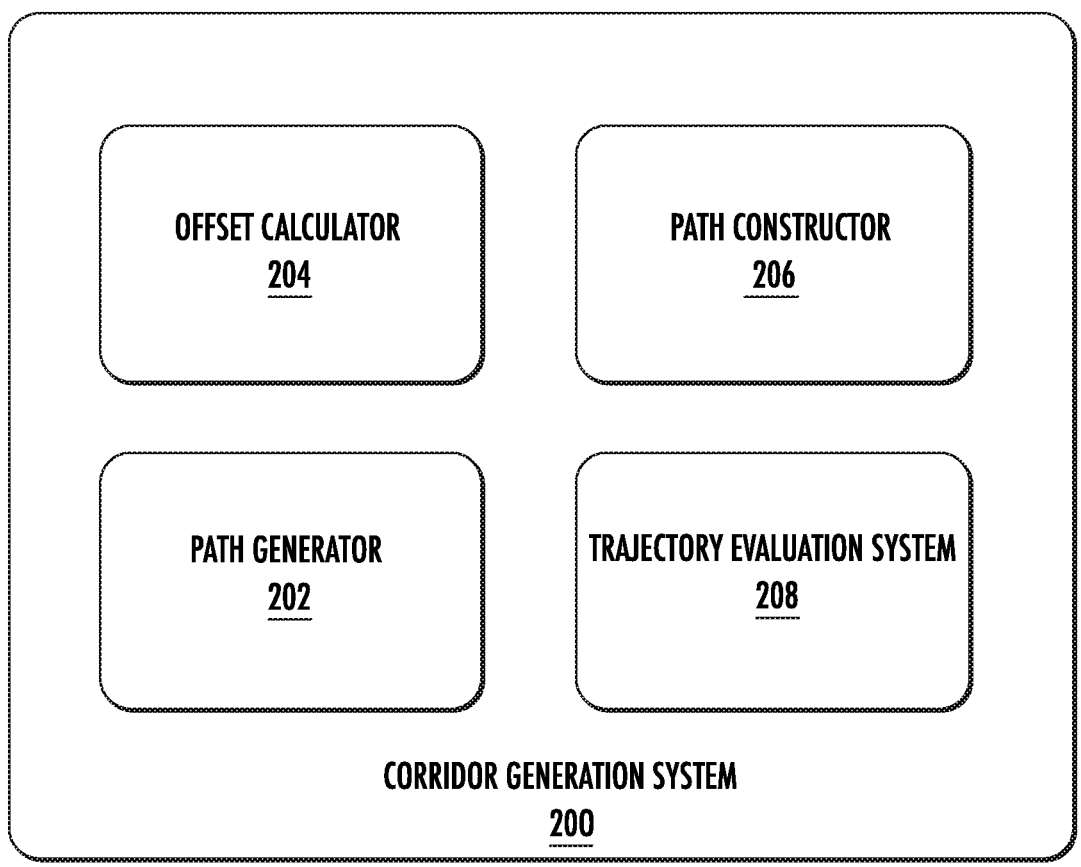
FIG. 2 depicts a block diagram of an example corridor generation system according to example embodiments of the present disclosure.

FIG. 2 depicts a block diagram of an example corridor generation system 200 according to example embodiments of the present disclosure. The corridor generation system 200 can generate a vehicle corridor for use in efficient path planning. To do so, the corridor generation system 200 can include one or more sub-systems or modules that help implement the aims of the corridor generation system. For example, the corridor generation system can include a path generator 202, an offset calculator 204, a corridor constructor 206, and a trajectory evaluation system 208.

The path generator 202 can obtain nominal path data for the autonomous vehicle based on an upcoming path. In some examples, the path generation system can identify a nominal path for the autonomous vehicle going forward. The path generator 202 can access the nominal path data for a particular amount of time. In some examples, the path generator 202 can estimate velocity data for the autonomous vehicle. Velocity data can be information supplied by a speed planner (or other component of a motion planner) that represents one or more estimated velocity values for the autonomous vehicle during a particular time period and one or more estimated acceleration values for the autonomous vehicle during the time period. Using the estimated velocity data, the path generator 202 can determine the amount of the nominal path to be accessed by the path generator 202. In some examples, the estimated velocity can be used to generate a maximum travel distance for a particular period of time.

The offset calculator 204 can obtain a longitudinal plan generated by the class planning system. The offset calculator 204 can determine the maximum travel distance during a particular period of time. One example of a time period may be eight seconds but other time periods can be used depending on the specific needs of the system for which the corridor is being generated. In addition, the offset calculator 204 can access map data for the geographic area around the autonomous vehicle and through which the autonomous vehicle will be passing. In some examples, the geographic area around the autonomous vehicle can include an area in the field of view of the autonomous vehicle. An area can be considered to be within the field of view of the autonomous vehicle can include any area that the autonomous vehicle can gather sensor data from. In some examples, the map data can include known obstacles in the geographic area. In addition, the offset calculator 204 can access information produced by the perception system to identify one or more obstacles in the area through which the autonomous vehicle will be passing.

The offset calculator 204 can determine a number of segments that will make up the corridor data structure. The segments can be two-dimensional or three-dimensional. Using the longitudinal plan, the offset calculator 204 can accurately determine the number of segments needed for the particular time period for which the corridor is being used. For example, if each segment represents 1 meter, and the autonomous vehicle is traveling at 11 meters per second for a period of 8 seconds, the offset calculator 204 can generate 90 segments (e.g., 88 segments plus a few extra segments as a buffer).

In some examples, the nominal path includes a series of points, each point being represented by a set of coordinates for the location of the autonomous vehicle at a particular point in time along the nominal path (e.g., 1 second, 2 seconds, 3 seconds, and so on). Thus, each point can represent a subsequent step in a time series along that nominal path such that the nominal path is represented by connecting each of the points. Each segment can represent a particular point or coordinate set in the series of points.

For each segment, the offset calculator 204 can determine the location of the point within the segment. The offset calculator 204 can identify one or more obstacles in the geographic area of the current corridor segment. In some examples, the offset calculator 204 can determine whether each obstacle is (or is not) blocking the nominal path. In accordance with the determination that a particular obstacle is not blocking the path, the offset calculator 204 can determine which side of the nominal path is associated with the obstacle. For example, the plurality of obstacles can be divided into obstacles that fall on the left side of the nominal path and obstacles that fall on the right side of the nominal path.

For each obstacle, the offset calculator 204 can determine whether the obstacle can be ignored. In some examples, an obstacle can be ignored based at least in part on the total distance between the point in the nominal path that is within the corridor segment and the obstacle. Any obstacles with a distance greater than a threshold distance value can be ignored with respect to the current corridor segment calculations. Thus, an obstacle can be ignored for one corridor segment but not for another.

In some examples, the offset calculator 204 can determine whether to ignore an obstacle by determining whether the obstacle intersects with a line drawn perpendicular to the nominal path within the current corridor segment. Each obstacle can be surrounded by a geometric shape (e.g., a circle, square, rectangle, etc.) that serves to define an outer limit of the obstacle's edges. If the geometric shape and the perpendicular line do not intersect, the obstacle can be ignored.

The offset calculator 204 can determine, for each obstacle that is not ignored, a distance between the obstacle and the coordinate set in the segment. In some examples this distance can be generated by extending a line perpendicular to the nominal path point and identifying the distance at which it intersects with each obstacle. As noted above, any obstacle not intersected contacted by the perpendicular line may be ignored.

The offset calculator 204 can determine a minimum distance between an obstacle and the point on the nominal path included in the current corridor segment. For example, the offset calculator 204 can determine the closest obstacle to the point on the nominal path that is included in the corridor segment. In some examples, the offset calculator 204 can determine a nearest obstacle on each side of the nominal path. Thus, the offset calculator 204 can determine both a left offset and a right offset for the corridor segment. In some examples, all the obstacles near the current corridor segment can be ignored (or there are no obstacles nearby to begin with). In this example, the offset calculator 204 can determine the distance from the autonomous vehicle to the edge of a lane in which the autonomous vehicle is currently traveling. The offset values can then be set such that the corridor segment extends across the entire current lane. In other examples, the offset value can be set to a predetermined default value.

In some examples, the offset calculator 204 can determine that the obstacle is blocking the nominal path. In response, the offset calculator 204 can determine a distance between the point of the nominal path and the edge of the obstacle (e.g., the distance the point would need to move to ensure that the nominal path does not intersect with the obstacle). This distance can then be set as the offset value for the corridor segment and set to a negative value, such that the corridor data structure passes around the obstacle. In other examples, the nominal path can be altered by laterally shifting the one or more points that would intersect with the obstacle. In addition, one or more points before or after the blocking obstacle can be laterally shifted to ensure that the path is smooth and does not generate acceleration values above a predetermined threshold.

In some examples, the offset calculator 204 can prefer generating a corridor segment such that it passes obstacles on the left. Thus when an obstacle is determined to be blocking, the offset calculator 204 can generate a negative offset value such that the corridor data structure can pass the obstacle on the left. In accordance with the determination that the obstacle is not blocking the nominal path, the offset calculator 204 can generate offset values for the corridor segment as described above.

In some examples, once all of the segments have been generated by the offset calculator 204, the corridor generation system can aggregate the corridor segments into a single corridor data structure that can represent the entire likely travel distance of the autonomous vehicle during a time period.

Once the corridor data structure has been generated, the corridor constructor 206 can use it to verify the safety of potential trajectories without having to reevaluate the entire path for potential obstacles and collisions. The trajectory evaluation system 208 can use this information to efficiently determine which candidate trajectories incur the least amount of cost (e.g., cost being a measure of the degree to which a trajectory meets one or more objectives of the motion planning system). This can result in significant savings in processing time and data storage needed to plan a path for the autonomous vehicle going forward.

Figure 3:
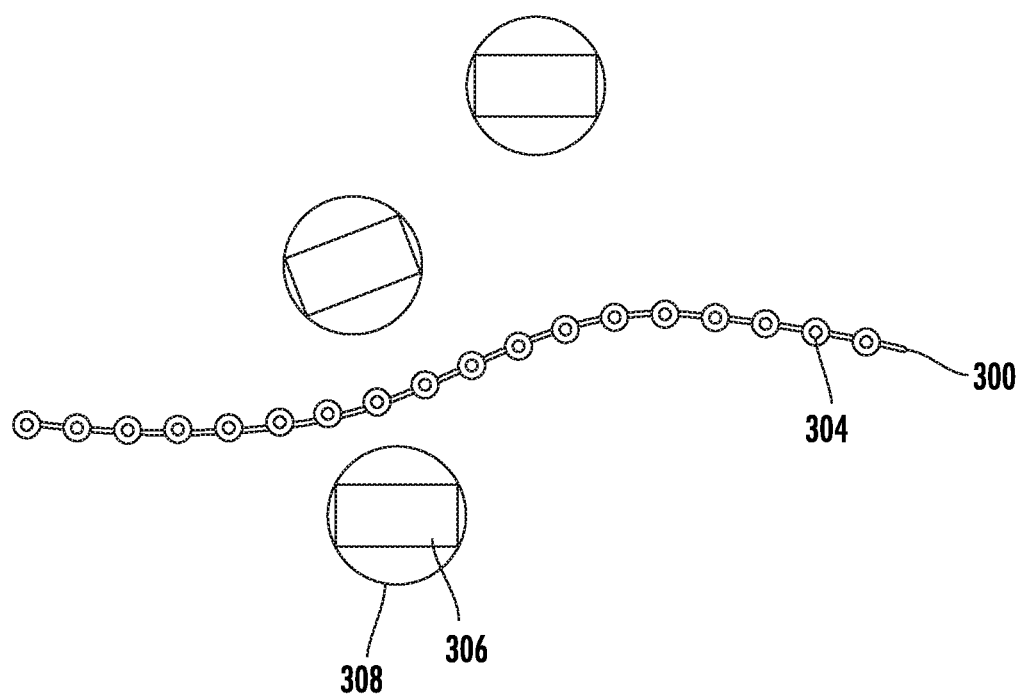
FIG. 3 depicts an example of a nominal path according to example embodiments of the present disclosure.

FIG. 3 depicts an example of a nominal path 300 according to example embodiments of the present disclosure. In some examples, the nominal path 300 includes a series of points 304, each point 304 being represented by a set of coordinates for the location of the autonomous vehicle at a particular point in time along the nominal path 300 (e.g., 1 second, 2 seconds, 3 seconds, and so on). Thus, each point 304 can represent a subsequent step in a time series along that nominal path such that the nominal path is represented by connecting each of the points. Each segment can represent a particular point 304 or coordinate set in the series of points. The nominal path 300 can also be associated with map data that describes the location of one or more lane boundaries 310.

The vehicle computing system (e.g., vehicle computing system 112 in FIG. 1) can also access obstacle data that describes one or more obstacles 306 in the area surrounding the nominal path 300. This can include, for example, the perception/state data and/or prediction data as described with reference to FIG. 1. The vehicle computing system (e.g., vehicle computing system 112 in FIG. 1) can generate an enveloping shape 308 (e.g., a circle, square, or other shape) around the obstacle/object to assist in calculating offset values. The size and shape of the enveloping shape can be based at least in part on the size, shape, and/or type of the obstacle/object.

Figure 4A:
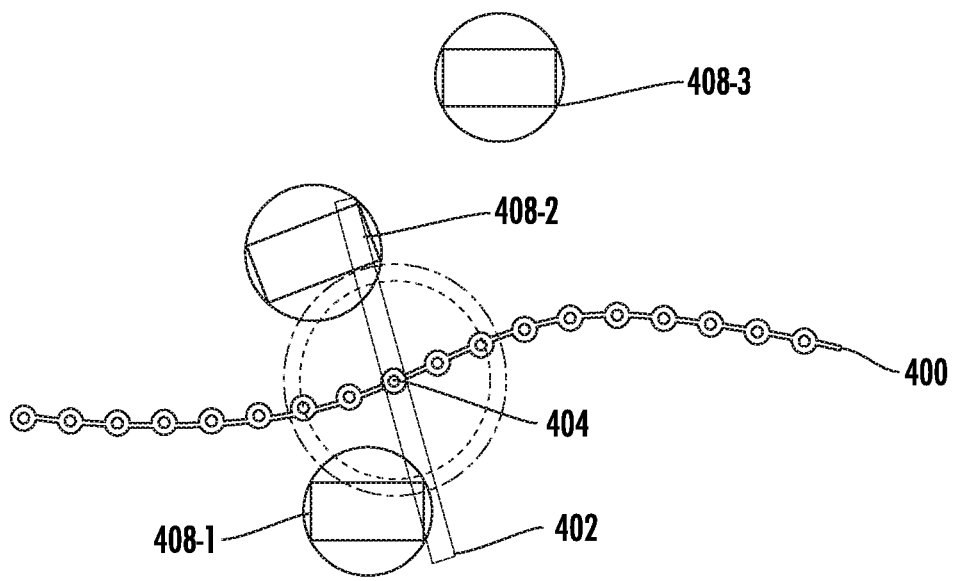
FIGS. 4A-4D depict an example process for determining an offset value for the corridor segment and generating a corridor data structure according to example embodiments of the present disclosure.

FIG. 4A depicts an example process for determining an offset value for the corridor segment and generating a corridor data structure according to example embodiments of the present disclosure. In this example, the corridor generation system (e.g., corridor generation system 200 in FIG. 2) can determine a plurality of segments 402 that will make up the corridor data structure.

For each segment, the corridor generation system (e.g., corridor generation system 200 in FIG. 2) can determine the location of a point 404 along the nominal path 400 within the current corridor segment 402. The corridor generation system (e.g., corridor generation system 200 in FIG. 2) can identify one or more obstacles (e.g., 408-1, 408-2, and 408-3) in the geographic area of the current corridor segment 402.

For each obstacle, the corridor generation system (e.g., corridor generation system 200 in FIG. 2) can determine whether the obstacle can be ignored. This can be based, for example, on a threshold distance from the point 404 (e.g., a ray-extended perpendicular distance, a straight-line distance, etc.). In this example, one obstacle 408-3 is too distant from the current corridor segment 402 (e.g., beyond 50 ft., etc.) and can thus be ignored. However, two other obstacles 408-1 and 408-2 are close enough (or located along a ray extended perpendicularly from the point along nominal path included in the current corridor segment). Each obstacle can be surrounded by a geometric shape (e.g., a circle, square, rectangle, etc.) that serves to define an outer limit of the obstacle's edges. If the geometric shape and the perpendicular line do not intersect, the obstacle (408) can be ignored.

The corridor generation system (e.g., corridor generation system 200 in FIG. 2) can determine, for each obstacle that is not ignored, a distance between the obstacle and the coordinate set in the current corridor segment 402. In some examples this distance can be generated by extending a line perpendicular to the nominal path point and identifying the distance at which it intersects with each obstacle. As noted above, any obstacle not intersected contacted by the perpendicular line may be ignored.

Figure 4B:
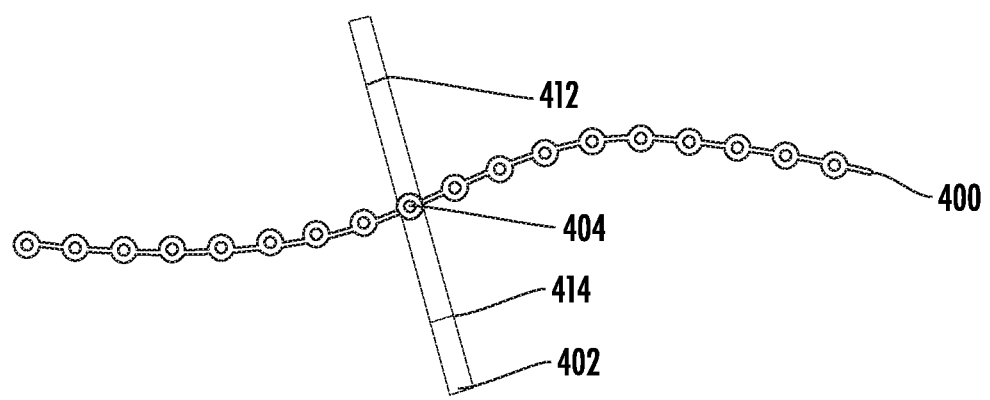

FIG. 4B depicts an example process for determining an offset value for the corridor segment and generating a corridor data structure according to example embodiments of the present disclosure. In this example, the corridor generation system (e.g., corridor generation system 200 in FIG. 2) can determine a minimum distance between an obstacle and the point 404 on the nominal path included 408-1 or 408-2) in the current corridor segment 402. For example, the corridor generation system (e.g., corridor generation system 200 in FIG. 2) can determine the closest obstacle (e.g., to the point on the nominal path that is included in the current corridor segment 402). For this example, this can include obstacle 408-2 on the left side of the nominal path and 408-1 on the right side of the nominal path.

In some examples, the corridor generation system (e.g., corridor generation system 200 in FIG. 2) can determine a nearest obstacle on each side of the nominal path. Thus, the corridor generation system (e.g., corridor generation system 200 in FIG. 2) can determine both a left offset 412 and a right offset 414 for the current corridor segment 402. In some examples, all the obstacles near the current corridor segment can be ignored (or there are no obstacles nearby to begin with). In this example, the corridor generation system (e.g., corridor generation system 200 in FIG. 2) can determine the distance from the autonomous vehicle to the edge of a lane the autonomous vehicle is currently in. The offset values can then be set such that the current corridor segment 402 extends across the entire current lane. In other examples, the offset value can be set to a predetermined default value. In some examples, the predetermined default value can be a fixed preset value (e.g., 12 feet). In another example, the predetermined default value can be associated with the standard lane width in the area in which the autonomous vehicle is travelling.

Figure 4C:
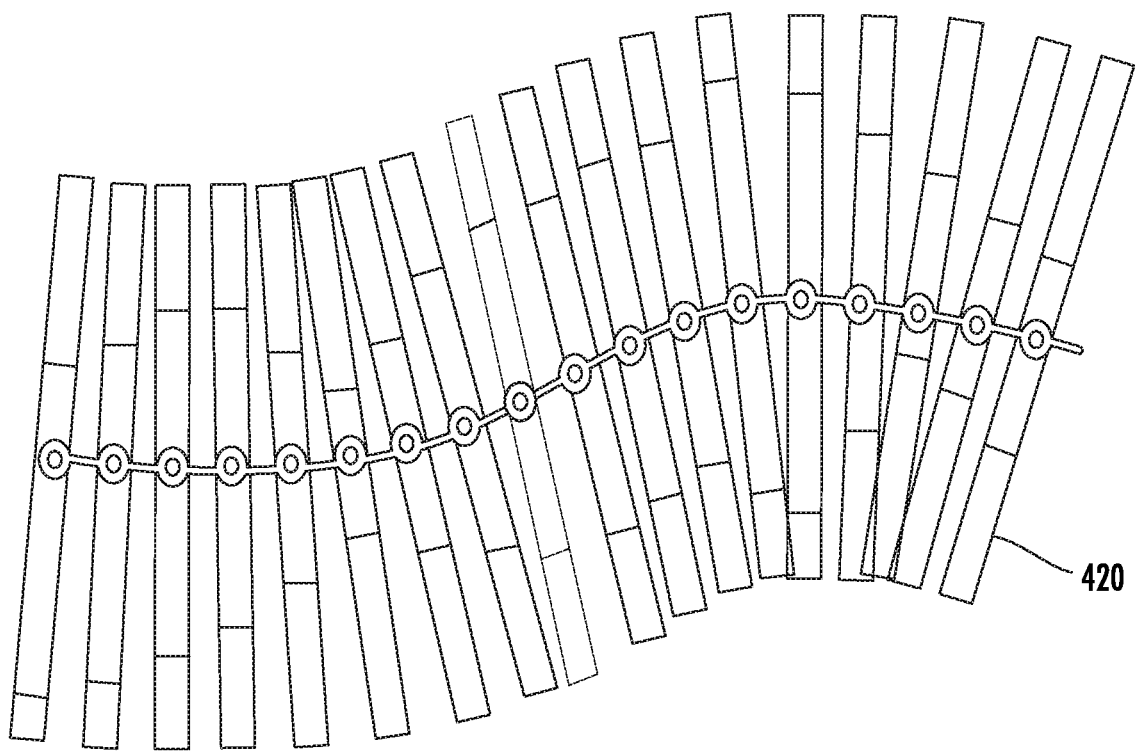

FIG. 4C depicts an example process for determining an offset value for the corridor segment and generating a corridor data structure according to example embodiments of the present disclosure. In this example, once all of the segments have been generated by the corridor generation system (e.g., corridor generation system 200 in FIG. 2), the corridor generation system (e.g., corridor generation system 200 in FIG. 2) can aggregate the corridor segments into a single corridor data structure 420 that can represent the entire likely travel distance/area of the autonomous vehicle during a time period.

Figure 4D:
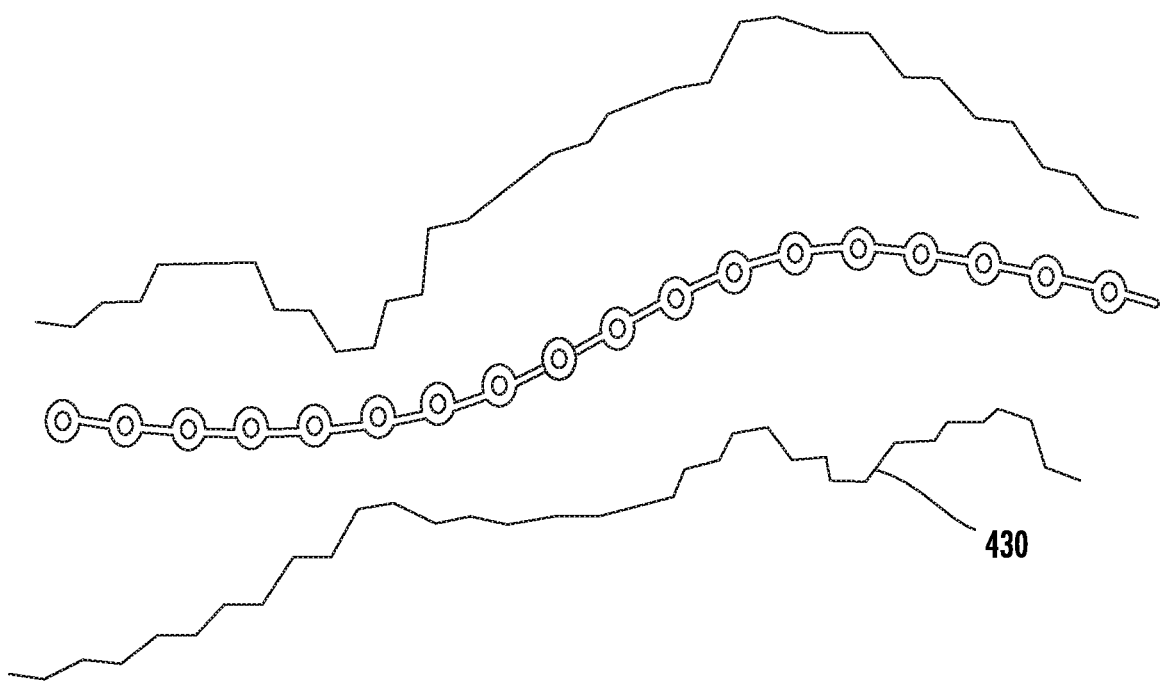

FIG. 4D depicts an example process for determining an offset value for the corridor segment and generating a corridor data structure according to example embodiments of the present disclosure. In this example, the corridor data structure can represent the full corridor data structure including combining the offset values at each segment along the corridor such that a single connected corridor 430 is depicted.

Figure 5:
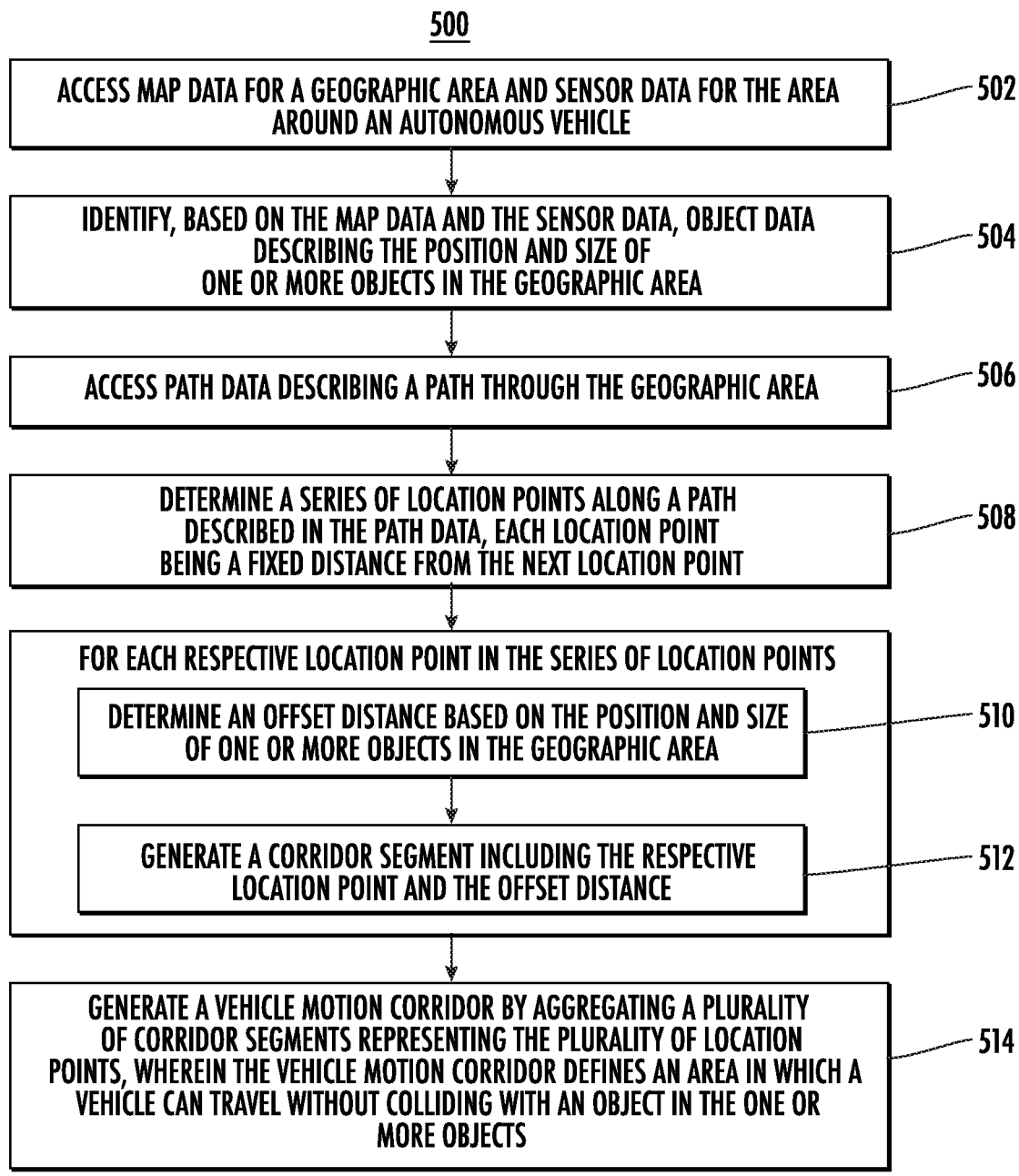
FIG. 5 depicts a flow chart diagram of an example method according to example embodiments of the present disclosure.

FIG. 5 depicts a flow chart diagram of an example method according to example embodiments of the present disclosure. One or more portions of method 500 can be implemented by one or more computing devices such as, for example, a computing device of an autonomous vehicle (e.g., autonomous vehicle 102) as depicted in FIG. 1. One or more portions of the method 500 described herein can be implemented as an algorithm on the hardware components of the devices described herein (e.g., as in FIG. 1 and FIG. 2) to, for example, to generate autonomous vehicle paths. Although FIG. 5 depicts steps performed in a particular order for purposes of illustration and discussion, method 500 of FIG. 5 is not limited to the particularly illustrated order or arrangement. The various steps of the methods disclosed herein can be omitted, rearranged, combined, and/or adapted in various ways without deviating from the scope of the present disclosure.

An autonomous vehicle (e.g., autonomous vehicle 102 in FIG. 1) can include a motion planning system (e.g., motion planning system 128 in FIG. 1). The motion planning system (e.g., motion planning system 128 in FIG. 1) can include a corridor generation system (e.g., corridor generation system 200 in FIG. 2). The corridor generation system (e.g., corridor generation system 200 in FIG. 2) can access, at 502, map data for a geographic area and sensor data for the geographic area around an autonomous vehicle. In some examples, the map data includes object data for the one or more objects in the geographic area of the autonomous vehicle. In some examples, the sensor data is point cloud data generated by a LIDAR sensor.

The corridor generation system (e.g., corridor generation system 200 in FIG. 2) can identify, at 504, based on the map data and the sensor data, object data describing a position and size of one or more objects in the geographic area of the autonomous vehicle. The corridor generation system (e.g., corridor generation system 200 in FIG. 2) can analyze the point cloud data to identify one or more objects in the geographic area of the autonomous vehicle.

The corridor generation system (e.g., corridor generation system 200 in FIG. 2) can access, at 506, path data describing a nominal path through the geographic area. The corridor generation system (e.g., corridor generation system 200 in FIG. 2) can determine, at 508, a series of locations along the nominal path described in the path data, each location being a fixed distance from the next location. The corridor generation system (e.g., corridor generation system 200 in FIG. 2) can determine a speed value associated with the autonomous vehicle. The corridor generation system (e.g., corridor generation system 200 in FIG. 2) can select a number of locations based, at least in part, on the speed value.

For each respective location in the series of locations, the corridor generation system (e.g., corridor generation system 200 in FIG. 2) can determine, at 510, an offset distance for the respective location based on the position and size of one or more objects in the geographic area. The corridor generation system (e.g., corridor generation system 200 in FIG. 2) can determine one or more distance values, each distance representing a distance from the respective location to one in the one or more objects. The corridor generation system (e.g., corridor generation system 200 in FIG. 2) can determine a smallest distance value from the one or more distance values. The corridor generation system (e.g., corridor generation system 200 in FIG. 2) can generate, at 512, a corridor segment including at least the smallest distance value.

The corridor generation system (e.g., corridor generation system 200 in FIG. 2) can access object data for one or more objects in the geographic area of the autonomous vehicle. For each object described in the object data. The corridor generation system (e.g., corridor generation system 200 in FIG. 2) can determine whether the object blocks the nominal path. In response to determining that the object does not block the nominal path, the corridor generation system (e.g., corridor generation system 200 in FIG. 2) can determine the distance between the object and the respective location. The corridor generation system (e.g., corridor generation system 200 in FIG. 2) can determine whether the distance between the object and the respective location exceeds a threshold distance. In response to determining that the distance between the object and the respective location exceeds a threshold distance, the corridor generation system (e.g., corridor generation system 200 in FIG. 2) can classify the object as ignorable for the respective location.

In response to determining that the distance between the object and the respective location does not exceed a threshold distance, the corridor generation system (e.g., corridor generation system 200 in FIG. 2) can classify the object as non-ignorable for the respective location. To determine the smallest distance value, the corridor generation system (e.g., corridor generation system 200 in FIG. 2) can select a smallest distance value from the distance values associated with objects that are classified as non-ignorable. In some examples, the offset distance can include a left offset value and a right offset value.

The corridor generation system (e.g., corridor generation system 200 in FIG. 2) can determine, for each object, whether the object is on a left side of the nominal path or a right side of the nominal path. The corridor generation system (e.g., corridor generation system 200 in FIG. 2) can identify one or more distance values for one or more objects determined to be on the left side of the nominal path. The corridor generation system (e.g., corridor generation system 200 in FIG. 2) can select a first smallest distance value from the one or more distance values associated with one or more objects determined to be on the left side of the nominal path. The corridor generation system (e.g., corridor generation system 200 in FIG. 2) can assign the first smallest distance value to the left offset value.

The corridor generation system (e.g., corridor generation system 200 in FIG. 2) can identify one or more distance values for one or more objects determined to be on the right side of the nominal path. The corridor generation system (e.g., corridor generation system 200 in FIG. 2) can select a second smallest distance value from the one or more distance values associated with one or more objects determined to be on the right side of the nominal path. The corridor generation system can assign the first smallest distance value to the right offset value.

The corridor generation system (e.g., corridor generation system 200 in FIG. 2) can determine, for each object, whether the nominal path will pass the object on the left side of the object or the right side of the object. In some examples, the corridor generation system (e.g., corridor generation system 200 in FIG. 2) can have a preferred side (e.g., passing the object on its left side). The corridor generation system (e.g., corridor generation system 200 in FIG. 2) can identify one or more distance values for one or more objects that the nominal path will pass on the left side. The corridor generation system (e.g., corridor generation system 200 in FIG. 2) can select a first smallest distance value from the one or more objects that the nominal path will pass on the left side. The corridor generation system (e.g., corridor generation system 200 in FIG. 2) can assign the first smallest distance value to the right offset value.

The corridor generation system (e.g., corridor generation system 200 in FIG. 2) can identify one or more distance values for one or more objects that the nominal path will pass on the right side. The corridor generation system (e.g., corridor generation system 200 in FIG. 2) can select a second smallest distance value from the one or more distance values associated with one or more objects that the nominal path will pass on the right side. The corridor generation system can assign the first smallest distance value to the left offset value.

The corridor generation system can, in response to determining that the object blocks the nominal path, determine which side of the blocking object the nominal path should pass. The corridor generation system can then generate offset values such that the corridor does not include the blocking object. To do so, the corridor generation system can determine the distance from the point of the nominal path inside the current segment to the edge of the object. This value can be represented as a negative and set to the offset value. In some examples, the distance from the point on the nominal path to the edge of the obstacle can be calculated such that the corridor data structure will pass on the left side of the object.

Using the calculated offset distance (or distances when both a left and right distance is generated, the corridor generation system (e.g., corridor generation system 200 in FIG. 2) can generate a corridor segment including the respective location and the offset distance(s). The corridor generation system (e.g., corridor generation system 200 in FIG. 2) can generate a vehicle motion corridor by aggregating a plurality of corridor segments representing the series of locations. The vehicle motion corridor can define an area in which a vehicle can travel without colliding with an object in the one or more objects.

Once the corridor data structure has been generated, the corridor generation system (e.g., corridor generation system 200 in FIG. 2) can generate a trajectory for the autonomous vehicle based, at least in part, on the vehicle motion corridor. For example, corridor generation system (e.g., corridor generation system 200 in FIG. 2) can compare each potential trajectory to the corridor data structure. To do so, the corridor generation system (e.g., corridor generation system 200 in FIG. 2) employed by the motion planner can determine the position of the autonomous vehicle at each point along a potential trajectory. Then, using the current position, heading, and dimensions of the autonomous vehicle, the corridor generation system (e.g., corridor generation system 200 in FIG. 2) can determine whether the autonomous vehicle will go outside the boundaries defined by the corridor data structure. If the potential trajectory causes the autonomous vehicle to go outside the boundaries defined by the corridor data structure, the corridor generation system (e.g., corridor generation system 200 in FIG. 2) can remove the potential from consideration. This allows the corridor generation system (e.g., corridor generation system 200 in FIG. 2) to significantly reduce the amount of time and processing cycles needed to evaluate potential trajectories.

Figure 6:
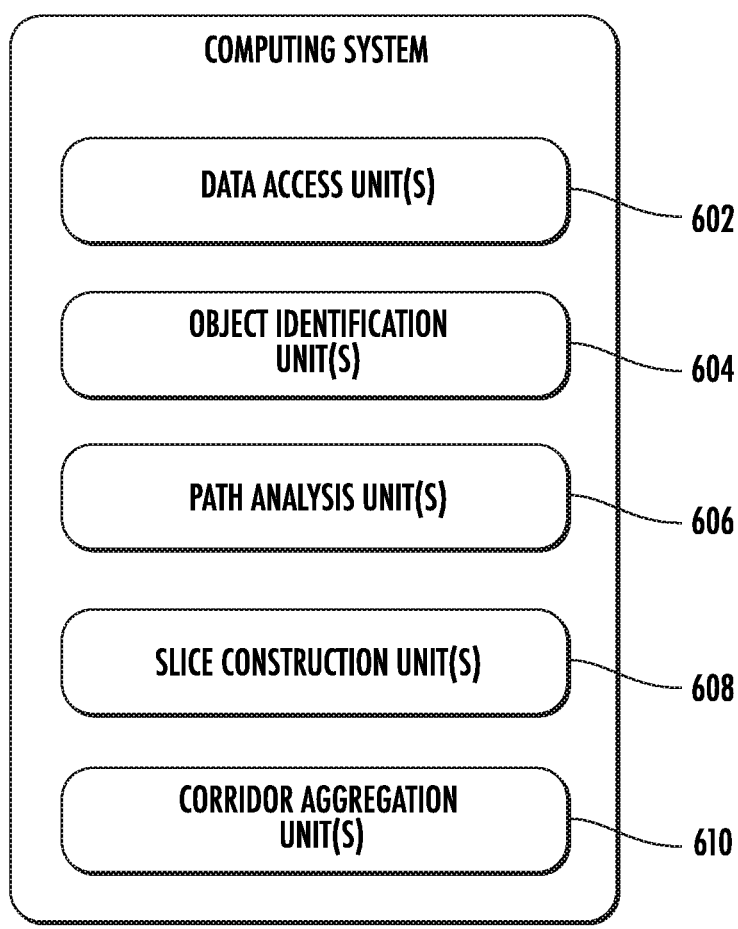
FIG. 6 depicts an example system with units for performing operations and functions according to example aspects of the present disclosure.

FIG. 6 depicts an example system with units for performing operations and functions according to example aspects of the present disclosure. Various means can be configured to perform the methods and processes described herein. For example, a computing system can include data access unit(s) 602, object identification unit(s) 604, path analysis unit(s) 606, slice constructions unit(s) 608, corridor aggregation unit(s) 610, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access map data for a geographic area and sensor data for the geographic area around an autonomous vehicle. For example, a corridor generation system can access map data from a map database and receive sensor data from, for example, a LIDAR sensor (and/or other sensors) associated with an autonomous vehicle. A data access unit 602 is one example of a means for accessing map data for a geographic area and sensor data for the geographic area around an autonomous vehicle.

The means can be configured to identify, based on the map data and the sensor data, object data describing the position and size of one or more objects in the geographic area of the autonomous vehicle. The corridor generation system can analyze map data and sensor data to identify the position and orientation of one or more objects in the area around the autonomous vehicle and its future path. An object identification unit 604 is one example of a means for identifying, based on the map data and the sensor data, object data describing the position and size of one or more objects in the geographic area of the autonomous vehicle.

The means can be configured to access path data describing a nominal path through the geographic area and determine a series of locations along the nominal path described in the path data, each location being a fixed distance from the next location. For example, the corridor generation system can access a predetermined nominal path with a series of locations already determined or determine the number of points along the nominal path based on the velocity of the autonomous vehicle. A path analysis unit 606 is one example of a means for accessing path data describing a nominal path through the geographic area and determining a series of locations along the nominal path described in the path data, each location being a fixed distance from the next location.

The means can be configured to determine an offset distance for the respective location based on the position and size of one or more objects in the geographic area and generate a corridor segment including the respective location and the offset distance for each respective location in the series of locations. For example, the corridor generation system can determine a distance from a point on the nominal path in the particular corridor segment to the closest obstacle and use that distance as the offset distance. A slice construction unit 608 is one example of a means for determining an offset distance for the respective location based on the position and size of one or more objects in the geographic area and generating a corridor segment including the respective location and the offset distance for each respective location in the series of locations.

The means can be configured to generate a vehicle motion corridor by aggregating a plurality of corridor segments representing the series of locations. The vehicle motion corridor can define an area in which a vehicle can travel without colliding with an object in the one or more objects. For example, the corridor generation system can aggregate the corridor segments such that they form a single contiguous corridor data structure. A corridor aggregation unit 610 is one example of a means for generating a vehicle motion corridor by aggregating a plurality of corridor segments representing the series of locations. The vehicle motion corridor can define an area in which a vehicle can travel without colliding with an object in the one or more objects.

Figure 7:
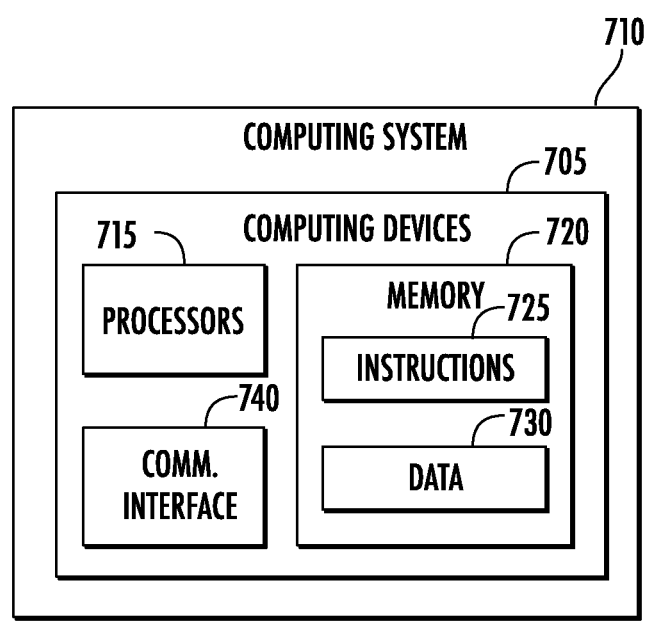
FIG. 7 depicts example system components according to example aspects of the present disclosure.

FIG. 7 depicts example system components according to example aspects of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The computing system 700 can be and/or include the vehicle computing system 112 of FIG. 1. The computing system 700 can be associated with a central operations system and/or an entity associated with the vehicle 105 such as, for example, a vehicle owner, vehicle manager, fleet operator, service provider, etc.

The computing device(s) 705 of the computing system 700 can include processor(s) 715 and at least one memory 720. The one or more processors 715 can be any suitable processing device (e.g., a processor core, a microprocessor, an ASIC, an FPGA, a controller, a microcontroller, etc.) and can be one processor or a plurality of processors that are operatively connected. The memory 720 can include one or more non-transitory computer-readable storage media, such as RAM, ROM, EEPROM, EPROM, one or more memory devices, flash memory devices, magnetic disks, data registers, etc., and combinations thereof.

The memory 720 can store information that can be accessed by the one or more processors 715. For instance, the memory 720 (e.g., one or more non-transitory computer-readable storage mediums, memory devices) can include computer-readable instructions 725 that can be executed by the one or more processors 715. The instructions 725 can be software written in any suitable programming language or can be implemented in hardware. Additionally, or alternatively, the instructions 725 can be executed in logically and/or virtually separate threads on processor(s) 715

For example, the memory 720 on-board the vehicle 105 can store instructions 725 that when executed by the one or more processors 715 cause the one or more processors 715 (e.g., in the vehicle computing system 112) to perform operations such as any of the operations and functions of the computing device(s) 705 and/or vehicle computing system 112 (and its sub-systems (e.g., the corridor generation system 200, etc.)), any of the operations and functions for which the vehicle computing system 112 (and/or its subsystems) are configured, and/or any other operations and functions described herein.

The memory 720 can store data 730 that can be obtained (e.g., received, accessed, written, manipulated, created, generated, etc.) and/or stored. The data 730 can include, for instance, services data (e.g., trip data, route data, user data, etc.), sensor data, map data, perception data, prediction data, motion planning data, obstacle location data, corridor segment data and any associated offset data, a corridor data structure and/or other data/information as described herein. In some implementations, the computing device(s) 705 can obtain data from one or more memories that are remote from the autonomous vehicle 102.

The computing device(s) 705 can also include a communication interface 740 used to communicate with one or more other system(s) (e.g., the remote computing system). The communication interface 740 can include any circuits, components, software, etc. for communicating via one or more networks (e.g., network(s)). In some implementations, the communication interface 740 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for generating autonomous vehicle paths, the method comprising:
    accessing, by a computing system including one or more processors, map data for a geographic area and sensor data for the geographic area around an autonomous vehicle;
    identifying, by the computing system and based on the map data and the sensor data, object data describing a position and a size of one or more objects in the geographic area of the autonomous vehicle;
    accessing, by the computing system, path data describing a nominal path through the geographic area, wherein the nominal path comprises a single series of points;
    determining, by the computing system, a plurality of corridor segments associated with the nominal path, wherein the plurality of corridor segments correspond to a series of locations along the nominal path described in the path data, each location being associated with an expected position of the autonomous vehicle at a particular point in time and a width of each corridor segment is defined by a left offset distance from the location and a right offset distance from the location, wherein determining, by the computing system, the plurality of corridor segments associated with the nominal path comprises:
    for at least one respective location in the series of locations:
    accessing, by the computing system, the object data for one or more of the objects in the geographic area of the respective location;
    for each object described in the object data:
    determining, by the computing system, whether the object blocks the nominal path in the respective location; and
    in response to determining that the object blocks the nominal path:
    determining, by the computing system, a passing side for the nominal path; and
    adjusting, by the computing system, the left offset distance to a negative value if a right side is the passing side and adjusting the right offset distance to a negative value if a left side is determined to be the passing side such that at least one point in the single series of points is not within the plurality of corridor segments;
    generating, by the computing system, a vehicle motion corridor by aggregating the plurality of corridor segments, wherein the vehicle motion corridor defines an area in which the autonomous vehicle can travel without colliding with the one or more objects; and
    controlling, by the computing system, the autonomous vehicle, based at least in part, on the vehicle motion corridor.

2. The computer-implemented method of claim 1, wherein determining, by the computing system, the plurality of corridor segments associated with the nominal path comprises:
    for at least one respective location in the series of locations:
    determining, by the computing system, the right offset distance and the left offset distance for the respective location based on the position and the size of at least one of the one or more objects in the geographic area; and
    generating, by the computing system, a corridor segment including the respective location and the right offset distance and the left offset distance.

3. The computer-implemented method of claim 2, wherein determining, by the computing system, the right offset distance and the left offset distance based on the position and the size of at least one of the one or more objects in the geographic area further comprises:
    determining, by the computing system, one or more distance values, each distance value representing a distance from the respective location to at least one of the one or more objects;
    determining, by the computing system, a smallest distance value from the one or more distance values; and
    generating, by the computing system, the corridor segment including at least the smallest distance value for one of the right offset distance and the left offset distance.

4. The computer-implemented method of claim 3, wherein determining, by the computing system, the right offset distance and the left offset distance for the respective location based on the position and the size of at least one of the one or more objects in the geographic area, further comprises:
    in response to determining that the object does not block the nominal path, determining, by the computing system, the distance between the object and the respective location;
    determining, by the computing system, whether the distance between the object and the respective location exceeds a threshold distance; and
    in response to determining that the distance between the object and the respective location exceeds the threshold distance, classifying, by the computing system, the object as ignorable for the respective location.

5. The computer-implemented method of claim 4, wherein determining, by the computing system, the right offset distance and the left offset distance for the respective location based on the position and the size of at least one of the one or more objects in the geographic area, further comprises:
    in response to determining that the distance between the object and the respective location does not exceed the threshold distance, classifying, by the computing system, the object as non-ignorable for the respective location.

6. The computer-implemented method of claim 5, wherein determining, by the computing system, the smallest distance value from the one or more distance values further comprises:
    selecting, by the computing system, the smallest distance value from the one or more distance values associated with the one or more objects that are classified as non-ignorable as an offset distance.

7. The computer-implemented method of claim 1, wherein the left offset distance and the right offset distance are initially both positive.

8. The computer-implemented method of claim 7, wherein determining, by the computing system, the right offset distance and the left offset distance for the respective location based on the position and the size of the one or more objects in the geographic area, further comprises:
    determining, by the computing system and for each object, whether the object is on a left side of the nominal path or a right side of the nominal path.

9. The computer-implemented method of any claim 8, determining, by the computing system, the right offset distance and the left offset distance for the respective location based on the position and the size of the one or more objects in the geographic area, further comprises:
   identifying, by the computing system, one or more distance values for the one or more objects determined to be on the left side of the nominal path;
   selecting, by the computing system, a first smallest distance value from the one or more distance values associated with the one or more objects determined to be on the left side of the nominal path; and
   assigning, by the computing system, the first smallest distance value to the left offset distance.

10. The computer-implemented method of claim 8, determining, by the computing system, the right offset distance and the left offset distance for the respective location based on the position and the size of the one or more objects in the geographic area, further comprises:
   identifying, by the computing system, one or more distance values for the one or more objects determined to be on the right side of the nominal path;
   selecting, by the computing system, a second smallest distance value from the one or more distance values associated with the one or more objects determined to be on the right side of the nominal path; and
   assigning, by the computing system, the second smallest distance value to the right offset distance.

11. The computer-implemented method of claim 8, wherein determining, by the computing system, the right offset distance and the left offset distance for the respective location based on the position and the size of the one or more objects in the geographic area, further comprises:
   determining, by the computing system and for each object, whether the nominal path will pass the object on the right side of the object or on a left side of the object.

12. The computer-implemented method of any claim 11, determining, by the computing system, the right offset distance and the left offset distance for the respective location based on the position and the size of the one or more objects in the geographic area, further comprises:
   identifying, by the computing system, one or more distance values for the one or more objects that are determined to be passed on the left side by the nominal path;
   selecting, by the computing system, a first smallest distance value from the one or more distance values associated with the one or more objects that are determined to be passed on the left side by the nominal path; and
   assigning, by the computing system, the first smallest distance value to the right offset distance.

13. The computer-implemented method of any claim 11, determining, by the computing system, the right offset distance and the left offset distance for the respective location based on the position and the size of the one or more objects in the geographic area, further comprises:
   identifying, by the computing system, one or more distance values for the one or more objects that are determined to be passed on the right side by the nominal path;
   selecting, by the computing system, a first smallest distance value from the one or more distance values associated with the one or more objects that are determined to be passed on the right side by the nominal path; and
   assigning, by the computing system, the first smallest distance value to the left offset distance.

14. The computer-implemented method of claim 1, wherein, in accordance with a determination that the passing side of the object is a right side, the right offset distance is increased and the left offset distance is set to the negative value; and
   in accordance with a determination that the passing side of the object is a left side, the left offset distance is increased and the right offset distance is set to the negative value.

15. The computer-implemented method of claim 1, wherein determining, by the computing system, the series of locations along the nominal path described in the path data, each location being a fixed distance from a next location further comprises:
   determining, by the computing system, velocity data associated with the autonomous vehicle; and
   selecting, by the computing system, a number of locations based, at least in part, on the velocity data.

16. A computing system for generating path corridors, the computing system comprising:
   one or more processors and a non-transitory computer-readable memory;
   wherein the non-transitory computer-readable memory stores instructions that, when executed by the one or more processors, cause the computing system to perform operations, the operations comprising:
   accessing map data for a geographic area and sensor data for the geographic area around an autonomous vehicle;
   identifying, based on the map data and the sensor data, object data describing a position and size of one or more objects in the geographic area of the autonomous vehicle;
   accessing path data describing a nominal path through the geographic area;
   determining a series of locations along the nominal path described in the path data, each location being associated with an expected position of the autonomous vehicle at a particular point in time;
   for a respective location in the series of locations:
   accessing, by the computing system, the object data for one or more of the objects in the geographic area of the respective location;
   determining a left offset distance from the respective location and a right offset distance from the respective location for the respective location based on the position and the size of the one or more objects in the geographic area;
   for each object described in the object data:
   determining whether the object blocks the nominal path in the respective location; and
   in response to determining that the object blocks the nominal path, determining a passing side for the nominal path; and
   adjusting the left offset distance to a negative value if a right side is the passing side and adjusting the right offset distance to a negative value if a left side is determined to be the passing side; and generating a corridor segment including the respective location and the left offset distance and the right offset distance such that at least one location in the series of locations is not within the corridor segment;
   generating a vehicle motion corridor by aggregating a plurality of corridor segments, wherein the vehicle motion corridor defines an area in which the autonomous vehicle can travel without colliding with an object in the one or more objects; and controlling the autonomous vehicle, based at least in part, on the vehicle motion corridor.

17. The computing system of claim 16, the operations further comprising:
generating a trajectory for the autonomous vehicle based, at least in part, on the vehicle motion corridor.

18. An autonomous vehicle, comprising:
one or more processors; and
one or more non-transitory computer-readable media that collectively store instructions that, when executed by the one or more processors, cause the one or more processors to perform operations, the operations comprising:
accessing map data for a geographic area and sensor data for the geographic area around the autonomous vehicle;
identifying, based on the map data and the sensor data, object data describing a position and size of one or more objects in the geographic area of the autonomous vehicle;
accessing path data describing a nominal path through the geographic area, wherein the nominal path comprises a single series of points;
determining a plurality of locations along the nominal path described in the path data, each location being associated with an expected position of the autonomous vehicle at a particular point in time;
generating a plurality of corridor segments, each corridor segment associated with a location in the plurality of locations, wherein a width of each corridor segment is defined by a left offset distance from the location and a right offset distance from the location and wherein determining a plurality of corridor segments comprises:
for at least one respective location in the series of locations:
accessing the object data for one or more of the objects in the geographic area of the respective location;
for each object described in the object data:
determining whether the object blocks the nominal path in the respective location;
in response to determining that the object blocks the nominal path, determining a passing side for the nominal path; and
adjusting the left offset distance to a negative value if a right side is the passing side and adjusting the right offset distance to a negative value if a left side is determined to be the passing side such that at least one point in the single series of points is not within the plurality of corridor segments;
generating a vehicle motion corridor by aggregating the plurality of corridor segments, wherein the vehicle motion corridor defines an area in which the autonomous vehicle can travel without colliding with an object in the one or more objects; and
controlling the autonomous vehicle, based at least in part, on the vehicle motion corridor.

19. The autonomous vehicle of claim 18, wherein the operations for generating the corridor segment for each of the plurality of locations further comprises:
for at least one respective location in the plurality of locations:
determining a left offset distance from the respective location and a right offset distance from the respective location for the respective location based on the position and the size of at least one of the one or more objects in the geographic area; and
generating a corridor segment including the respective location and the left offset distance and the right offset distance.

\* \* \* \* \*